United States Patent
Zou et al.

(10) Patent No.: US 7,100,029 B2
(45) Date of Patent: Aug. 29, 2006

(54) PERFORMING REPEAT STRING OPERATIONS

(75) Inventors: Xiang Zou, Beaverton, OR (US); Rajesh S. Parthasarathy, Hillsboro, OR (US); Madhavan Parthasarathy, Beaverton, OR (US); Dion Rodgers, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 455 days.

(21) Appl. No.: 10/233,155

(22) Filed: Aug. 28, 2002

(65) Prior Publication Data

US 2004/0044885 A1 Mar. 4, 2004

(51) Int. Cl.
G06F 9/38 (2006.01)
G06F 9/00 (2006.01)

(52) U.S. Cl. ............................ 712/300; 712/220
(58) Field of Classification Search ............... 712/300, 712/220
See application file for complete search history.

(56) References Cited

U.S. PATENT DOCUMENTS 5,578,560 A 11/1996 Giesen et al.
5,701,517 A * 12/1997 Carpenter ............... 710/66
5,835,972 A 11/1998 Choate
6,032,252 A 2/2000 Petro et al.

OTHER PUBLICATIONS

IBM Tehcnical Disclosure Bulletin # NA840695, Dynamic Boundary Algorithm for a Data Movement Mechanism, Jun. 1984, vol. 27, Issue 1A, pp. 95-100.*
Intel Architecture Software Developer's Manual, vol. 1: Basic Architecture, pp. 6-39-6-41.
Intel Architecture Software Developer's Manual, vol. 2: Instruction Set Reference, "REP/REPE/REPZ/REPNE/REPNZ—Repeat String Operation Prefix," pp. 3-404-3-406.
IA32 Intel Architecture Software Developer's Manual, vol. 3: System Programming Guide, pp. 7-10-7-11.

* cited by examiner

*Primary Examiner*—Henry W. H. Tsai
(74) *Attorney, Agent, or Firm*—Fish & Richardson P.C.

(57) ABSTRACT

Performing repeat string operations can include aligning a source data location or a destination data location to a location divisible by a predetermined integer, the aligning including performing a string operation using data having a size equal to the operand size. After aligning, a string operation can be performed using data having a size larger than the operand size. Performing repeat string operations can include issuing a first predetermined number of iterations if an operand size is a predetermined size, and issuing a second predetermined number of iterations otherwise. Performing repeat string operations can include determining that a requested number of iterations in a repeat string operation is within a predetermined multi-number range and issuing exactly the requested number of iterations for any value of the requested number within that range.

21 Claims, 10 Drawing Sheets

PERFORMING REPEAT STRING OPERATIONS

BACKGROUND

Implementations discussed below relate generally to processing operations in a computing environment, and certain implementations relate more particularly to processing repeat string operations.

Processors can be tasked with carrying out an operation, also referred to as an instruction, multiple times in succession. This can be the case for string operations such as, for example, a move operation that moves data from one memory location to another memory location, or a store operation that moves data from a register to a memory location. A move operation can be repeated multiple times to move an entire block of data rather than just a single data element. A store can be repeated to initialize a block of data. The REP prefix may be used with an instruction to indicate that the instruction is to be repeated for a specified number of iterations. There is a continuing need for new and useful ways to perform repeated instructions efficiently in terms of time, usage of processor resources, or any of a variety of other metrics.

DETAILED DESCRIPTION

In various instruction sets and architectures, a repeat prefix, having a symbol REP, can be used with a particular instruction to cause a processor to repeat the instruction a given number of times (iterations). Examples may include REP MOVSB (move/copy a string of one-byte data items), REP MOVSW (move/copy a string of two-byte data items), REP MOVSD (move/copy a string four-byte data items), REP STOSW (store a string of two-byte data items), and REP CMPSD (compare a string of four-byte data items). Each iteration typically involves doing the memory transfer and then updating registers that hold the memory address for the data. The REP prefix can also be used with other instructions, such as, for example, LODS (load string). A register referred to as the ECX register may be used to specify the number of iterations that need to be executed for a particular repeat string operation. Although the described implementations employ the REP prefix, other mechanisms can be used to repeat an instruction, and the described features are equally applicable to such other mechanisms. In a processor context, string operations are generally performed using microoperations.

The life of a microoperation within a processor has distinct phases. One phase is called issuance, and a subsequent phase is called execution. The delay, and potential idle time, between issuance and execution can result in decreased performance measures for a processor. It is possible, however, for a processor to cancel a microoperation after the microoperation has been issued and before the microoperation has been executed. Accordingly, some processors predict the number of iterations that will be requested by a repeat string operation, and issue iterations based on that prediction. These processors can then cancel the unneeded iterations at a later time, but before the unneeded iterations have been executed. A misprediction can bring about additional delays, however, due to the need to cancel issued operations.

To improve performance, various implementations discussed below either attempt to make accurate predictions of the number of iterations that will be requested or focus on issuing exactly the requested number of iterations. Various implementations also perform overhead computations in parallel with the data transfer to reduce the overall time for performing the repeat string operations, or attempt to perform the requested repeat string operations faster by transferring data in larger blocks than requested by the instruction.

Figure 1:
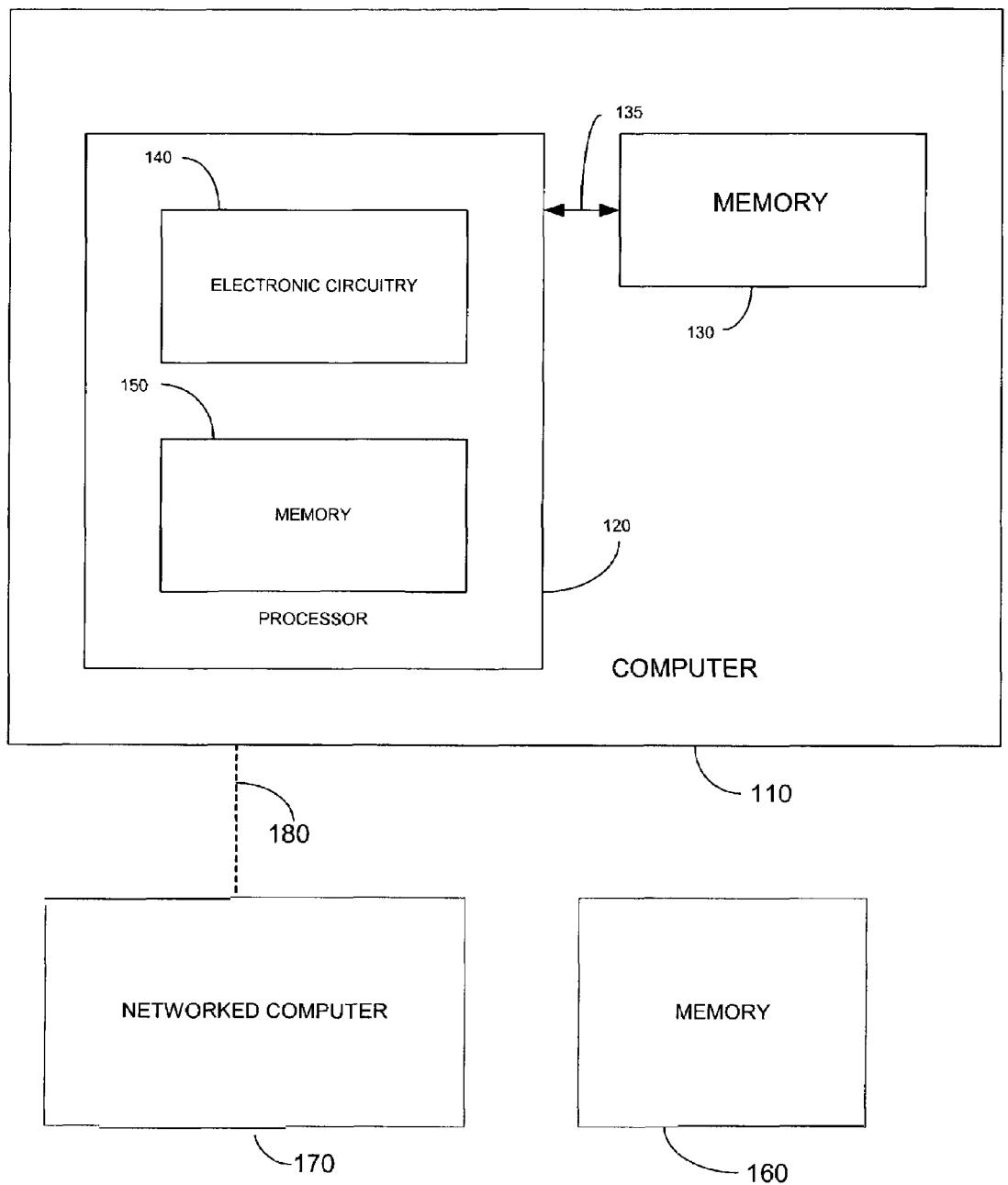
FIG. 1 is a block diagram of a system for performing a disclosed repeat string operation.

Referring to FIG. 1, a system 100 for performing a repeat string operation includes a computer 110 having a processor 120, a memory 130, and a bus 135 connecting the processor 120 and the memory 130. The processor 120 includes electronic circuitry 140 and processor memory 150 that can be connected by a bus or other connection (not shown). The system 100 also includes an external memory 160. The processor 120 can perform any of the processes disclosed below using the electronic circuitry 140 and/or the processor memory 150. Further, the memory 160 can store instructions for causing a computer to perform any of the processes disclosed below. The computer 110 is optionally coupled to a networked computer 170 over a network connection 180.

Short Repeat String Operations

Figure 2:
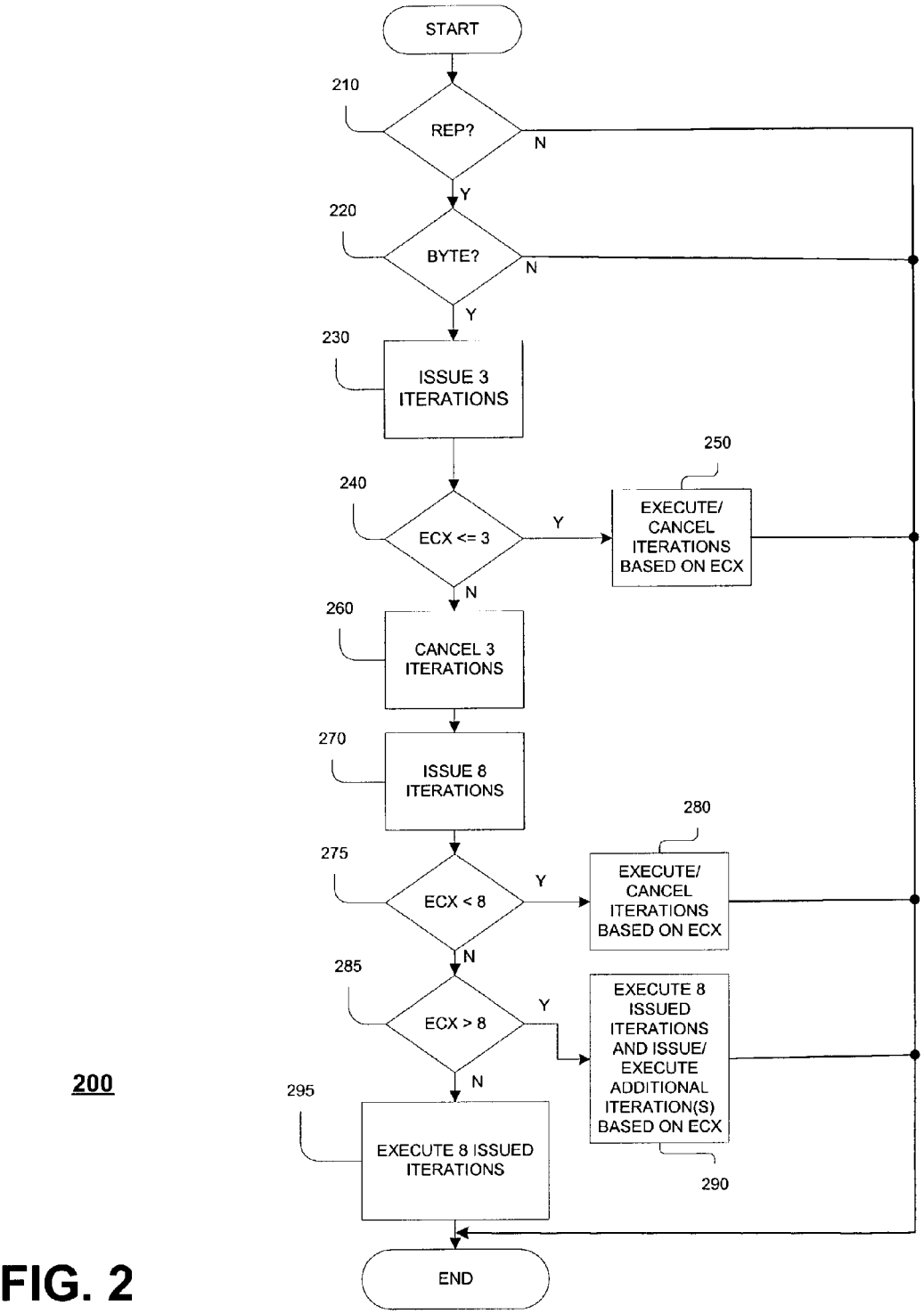
FIG. 2 is a flow chart of a process for performing short repeat string operations.

FIG. 2 shows a process 200 for performing short repeat string operations (i.e., string operations that are to be executed fewer than eight times). However, the process 200 can also perform repeat string operations that are not short. Initially, the process includes checking for a REP prefix in an instruction (210). If there is no REP prefix, then there is no repeat string operation to be performed.

When there is a REP prefix, the repeat string operation is checked for the size of the operand (220). The process 200 only continues if the operand size is a byte, such as, for example, with REP MOVSB (as opposed to MOVSW or MOVSD). This is because the process 200 is tailored to byte operations. Other implementations may use the process 200 for word, doubleword, or any other length operands.

Next, three iterations of the string operation are issued (230). Collected data indicates that at least 99% of REP MOVSB instructions in certain implementations involve three or fewer iterations. In certain implementations, the bulk of the required memory transfer is performed using double-word transfers, resulting in a remainder of three or fewer bytes to transfer. This remainder is then processed via byte string operations. Hence, in such implementations, the vast majority of byte string operations have ECX less than or equal to three. Thus, three can be used as a ceiling for the expected number of iterations. Other implementations can issue any number of initial iterations (e.g., eight) and the determination of how many iterations to issue can be based on any relevant factor(s).

The ECX register is then checked to determine if the actual number of requested iterations is within the prediction of three or less (240). In certain implementations, the ECX register is checked before issuing any iteration.

If the actual number of iterations (ECX) is less than or equal to three, then the issued iterations are executed or cancelled as appropriate (250). In particular, the number of iterations executed equals the value in the ECX register (ECX) and the number of iterations cancelled equals three minus the value in the ECX register (3-ECX). The data transfer is then complete.

If the actual number of iterations (ECX) is greater than three, then the three issued iterations are cancelled (260), and another eight iterations are issued (270). Other implementations can issue any number of iterations, based, for example, on data collected for predictive purposes, or other factors. Additional implementations do not cancel the three issued iterations. Instead, they issue additional iterations based on, for example, the value of the ECX register.

Next, the value of the ECX register is checked to see if it is less than eight (275). If so, the issued iterations are executed or cancelled as appropriate (280). In particular, ECX iterations are executed and 8-ECX iterations are cancelled.

If ECX is not less than eight, ECX is checked to see if it is greater than eight (285). If ECX is greater than eight, then all of the eight iterations that have already been issued are executed and ECX-8 additional iterations are issued and executed (290). If ECX is not greater than eight, then the eight issued iterations are executed (295).

Medium-Length Repeat String Operations

Figure 3:
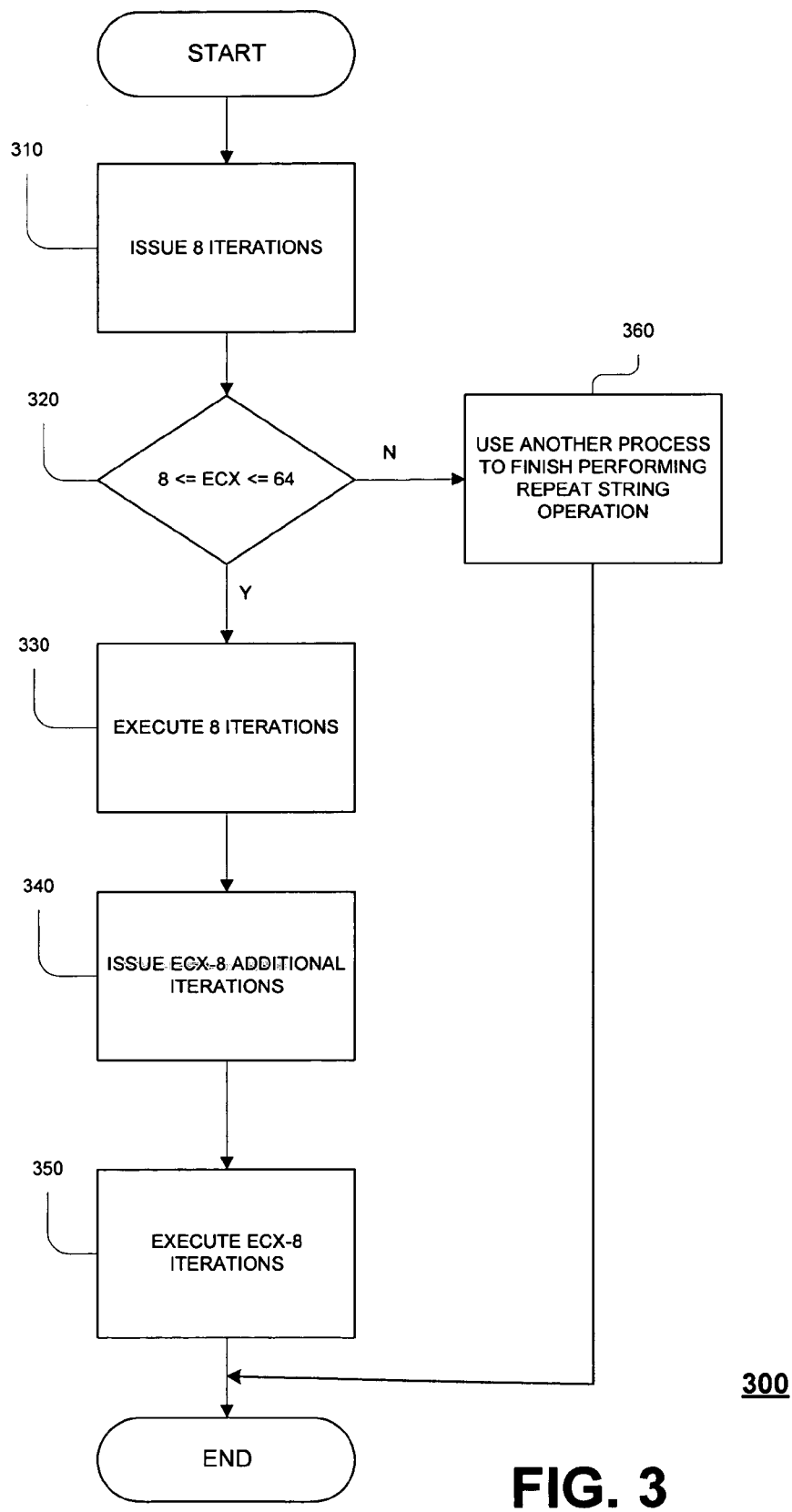
FIG. 3 is a flow chart of a process for performing medium-length repeat string operations.

FIG. 3 shows a flow chart of a process 300 primarily adapted for performing medium-length repeat string operations, where medium-length repeat string operations are designated as those that request between eight and sixty-four iterations. The selection of "eight" and "sixty-four" is specific to the implementation described and the designation of medium-length may vary with other implementations. In the implementation described, the selection of "eight" is based on latency, and the selection of "sixty-four" is based on performance considerations and generally reflects the point at which the algorithm for fast repeat string operations (described later) performs better than the process 300. The process 300 may be used regardless of operand size, not being restricted to byte operands. The process 300 performs medium-length repeat string operations by issuing exactly the number of iterations that are requested which means that there is no need to cancel any issued iterations.

The process 300 includes issuing eight initial iterations (310). The value of ECX is checked to determine whether ECX is between eight and sixty-four, inclusive (320). ECX can be checked before or after issuing the eight iterations.

Figure 4:
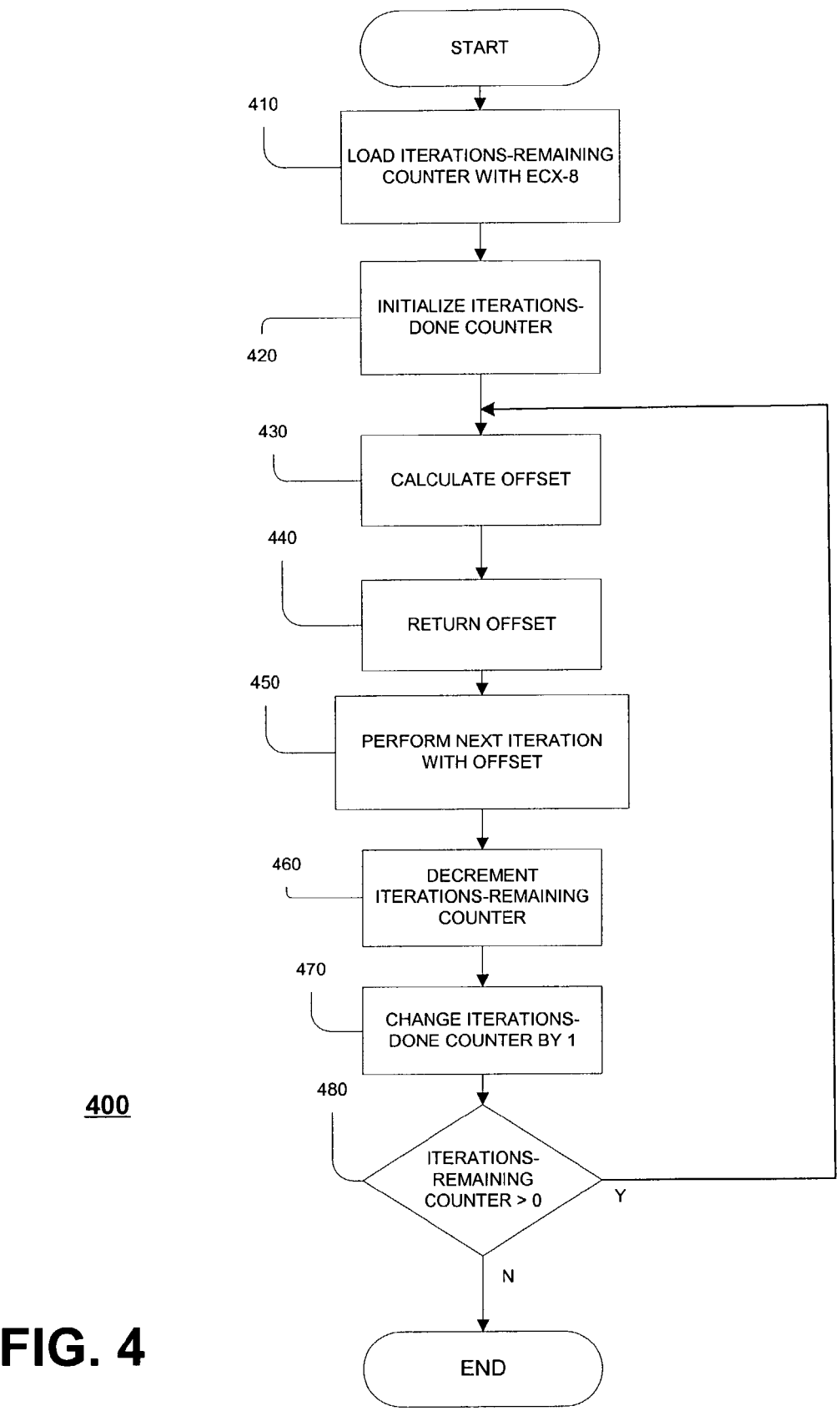
FIG. 4 is a flow chart of a process for executing iterations in performing the process of FIG. 3.

If ECX is between eight and sixty-four, the initially issued eight iterations are executed (330). Further, ECX-8 additional iterations are issued (340) and executed (350). FIG. 4, discussed below, is a flow chart of a process 400 for executing the additional ECX-8 additional iterations.

If ECX is not between eight and sixty-four, another process is called to continue performing the repeat string operation (360). For example, for short repeat string operations (i.e., less than eight iterations), the process 200, beginning with operation 275, can be used. For long repeat string operations (i.e., more than sixty-four iterations), a process 500, discussed below, can be used.

The processes 200 and 300, or variations of them, can be combined in many other ways to perform both short and medium length repeat string operations. For example, the process 200 can be modified by substituting for operation 290 the operations 320–350 from the process 300.

FIG. 4 shows a flow chart of the process 400 for executing the additional ECX-8 iterations (operation 350 of the process 300). The process 400 relates to a particular implementation that uses both hardware registers and microcode.

The process 400 includes loading a loop counter register with the value of ECX-8 (410). The loop counter is a count-down counter that keeps track of the number of iterations remaining to be issued and executed, and is referred to as the iterations-remaining counter. Loading the iterations-remaining counter register may be done using microcode, and the iterations-remaining counter register may be in an issuance section for a microoperation.

An up/down counter, referred to as the iterations-done counter, is initialized to zero (420). The initialization can be done, for example, with a micro-operation ("uop") in microcode. The iterations-done counter counts either up or down, with the absolute value of the iterations-done counter reflecting the number of iterations completed, and the iterations-done counter is incremented or decremented once per iteration. The iterations-done counter is incremented if the repeat string operation is forward-marching, that is, accessing progressively higher memory addresses as source and/or destination locations. The iterations-done counter is decremented if the repeat string operation is backward-marching, that is, accessing progressively lower memory addresses as source and/or destination locations.

A memory address offset is calculated in hardware using the value of the iterations-done counter and the data/item size of the operand of the repeat string operation (430). For example, assuming that the iterations-done counter has a value of one and the operand is doubleword (four bytes), then the calculated address offset will be four.

The value of the address offset is returned to microcode (440). The microcode then uses the offset in performing the next iteration of the repeat string operation (450). Specifically, the microcode may use the offset to calculate the source and destination addresses of the next iteration. In typical implementations of a REP MOVS operation, a register called ESI stores the initial address of the source data location and a register called EDI stores the initial address of the destination data location. The microcode adds the offset to ESI to determine the location for loading data, and adds the offset to EDI to determine the location for storing data. This example assumes that the values of ESI and EDI are adjusted to account for the initial eight iterations executed in operation 330 of process 300.

After the issuance of each iteration, the iterations-remaining counter is decremented (460) and the iterations-done counter is either incremented or decremented (470). The iterations-remaining counter is then checked to see if its value is greater than zero, indicating that issue of the repeat string operation is not finished (480). If the iterations-remaining counter is greater than zero, then the process 400 jumps back to operation 430. Otherwise, the process 400 ends. Another implementation does not use an iterations-remaining counter, but compares the absolute value of the iterations-done counter to the value of ECX-8.

Another implementation for performing medium-length (and short) repeat string operations does not necessarily issue exactly the requested number of iterations. The implementation issues iterations in groups of eight, canceling those that are not needed. Thus, for requests of zero to eight iterations, the implementation issues eight iterations, for requests of nine to sixteen iterations, the implementation issues sixteen iterations (in two groups of eight), and so forth. This implementation takes advantage of efficiencies obtained by performing the iterations in groups of eight.

Long Repeat String Operations-General

Figure 5:
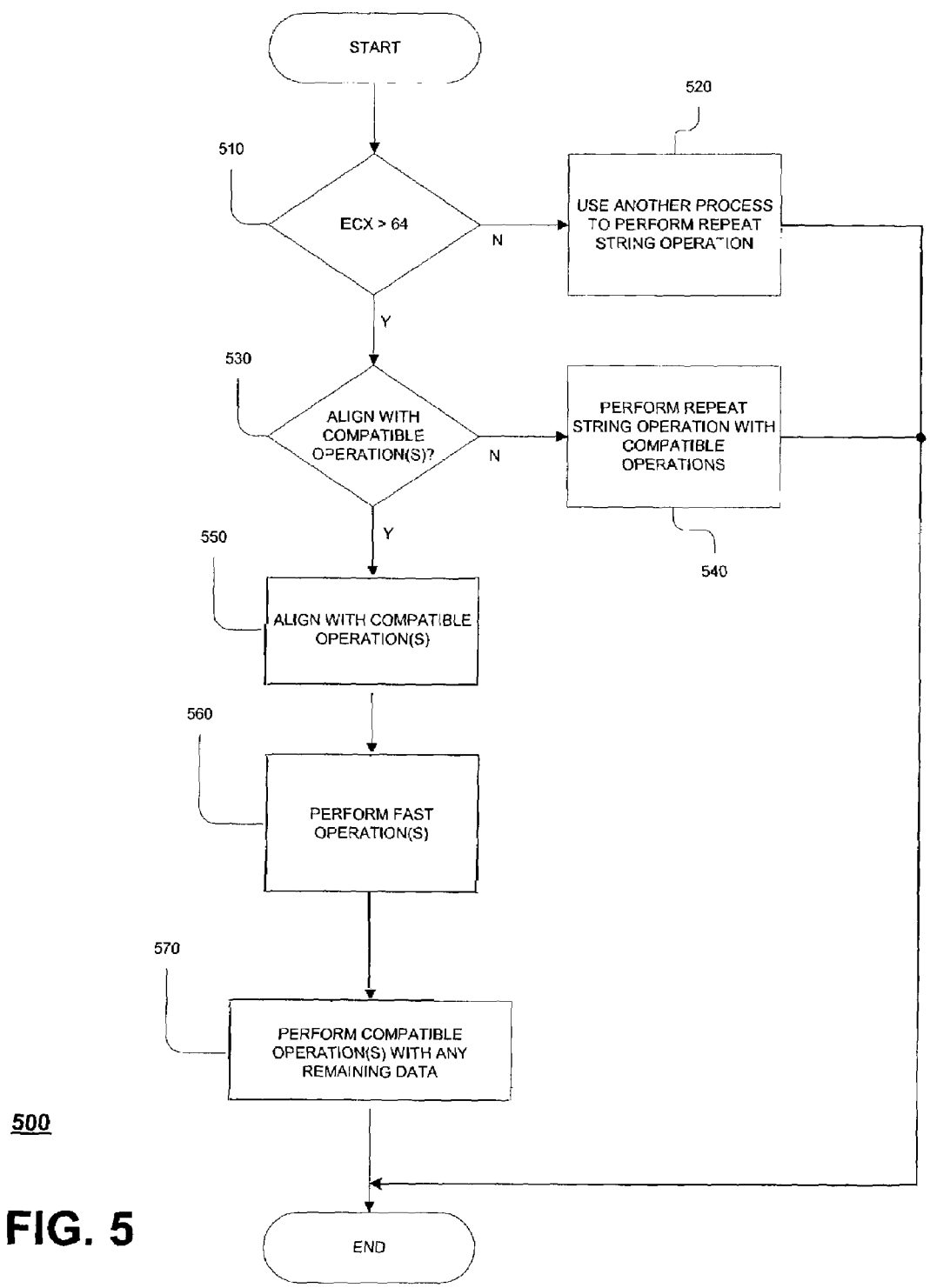
FIG. 5 is a flow chart of a process for performing long repeat string operations.

FIG. 5 provides a flow chart of a process 500 for performing long repeat string operations. A long repeat string operation includes repeat string operations requesting more than sixty-four iterations.

The designation of "short," "medium-length," and "long" depends entirely on the value of ECX and is based, therefore, on the number of iterations requested. It is clear that certain medium-length repeat string operations, for example, can involve more data transfer than certain long repeat string operations. For example, REP MOVSD with ECX=60 (medium-length) will move 240 bytes of data, whereas REP MOVSB with ECX=65 (long) will move only 65 bytes of data. Other implementations can place more emphasis on the operand size when determining how to designate and perform the repeat string operation.

The process 500 includes determining whether ECX is greater than sixty-four (510). If ECX is not greater than sixty-four, then the repeat string operation is not a long repeat string operation. Accordingly, a process for performing shorter repeat string operations is used (520). Examples of suitable processes include processes 200 and 300 discussed above.

If ECX is greater than sixty-four, then the repeat string operation is a long repeat string operation. The process 500 then determines whether ESI and/or EDI can be aligned using compatible operations (530).

Compatible operations refer to operations, including, for example, string operations and repeat string operations, that operate on data using a data size that is the same size as the operand. For example, in a REP MOVSB instruction, the operand is a byte, and, if ECX=32, a compatible operation would move the 32 bytes of data one byte at a time. Similarly, in a REP MOVSD instruction, the operand is a four-byte doubleword, and, if ECX=32, a compatible operation would move the 128 (32*4) bytes of data four bytes at a time.

A fast operation, in contrast, operates on the data using a data size larger than the operand size. If the fast operation is a string operation, then the fast operation can also be referred to as a fast string operation. Looking again at a REP MOVSD instruction with ECX=32, a fast operation might move the 128 bytes eight bytes at a time, sixteen bytes at a time, or some other number greater than four at a time. Fast operations are generally faster than compatible operations because the fast operations can move more data in each transfer. It is often desirable, therefore, to use fast operations, particularly with long repeat string operations. The final string data results in memory should be identical whether fast operations or compatible operations are used.

The faster speed is not without a price, however, because there is overhead associated with fast operations. The decision to use fast operations only when ECX>64 reflects the overhead cost. In some implementations, fast operations are also only used in particular addressing modes, such as 32 bit and not 16 bit, due to various overhead concerns.

In fast operations, it is often desirable to align either the source and/or destination data locations with the size of the data being moved. A memory location aligns with a particular data size if the location's address is divisible by that size. For example, the address 128 is aligned with data sizes of 128 bytes, 64 bytes, 32 bytes, 16 bytes, 8 bytes, 4 bytes, 2 bytes, and 1 byte, but not with data sizes of 100 bytes or 12 bytes, for example. In this example, the address can be said to be 16-aligned, for example. Fast operations generally can be performed without aligning an address, but performance often suffers because cache line splits occur in accessing the data. Accordingly, without alignment, the memory operations may have even better performance if done with only compatible operations.

It is not always possible to align an address using compatible operations. For example, with a REP MOVSW instruction and EDI=3, compatible operations cannot 16-align EDI because EDI will always have an odd value. In such cases, the long repeat string operation is performed with compatible operations (540). In general, however, if ESI and/or EDI is aligned with the operand size, referred to as O-size aligned, it is possible to use compatible operations to 8-align or 16-align the address(es).

If the address can be aligned with one or more compatible operations, then one or more compatible operations are first performed to align either EDI and/or ESI (550). The number of compatible operations required to align a memory address will depend on the data size with which the address needs to be aligned. For example, a REP MOVSB repeat string operation with EDI=6, and forward-marching, will require two compatible operations to 8-align EDI and ten compatible operations to 16-align EDI.

After aligning at least one memory address (550), a fast operation is performed with that address, in either a forward-marching or backward-marching direction (560). Fast operations can be performed until the remaining data to be processed is less than the size of the fast operation. After that, compatible operations are performed until the remaining data is processed (570). For example, assuming a REP MOVSB instruction with ECX=150, there are 150 bytes to be moved. Further assuming that the fast operation can move 16 bytes, and that the memory addresses were both 16-aligned to begin with, then after nine fast operations there will remain six bytes to move. The remaining six bytes are too small to use a fast operation, so six compatible operations (byte operations in this example) are performed.

Long Repeat String Operations-Fast Operations Implementations

FIGS. 6, 7, 8A, and 9 show four flow charts of processes 600, 700, 800, 900 for use with the process 500. The processes 600, 700, 800, 900 are for performing fast repeat string operations, as recited in operation 560 of the process 500.

Figure 6:
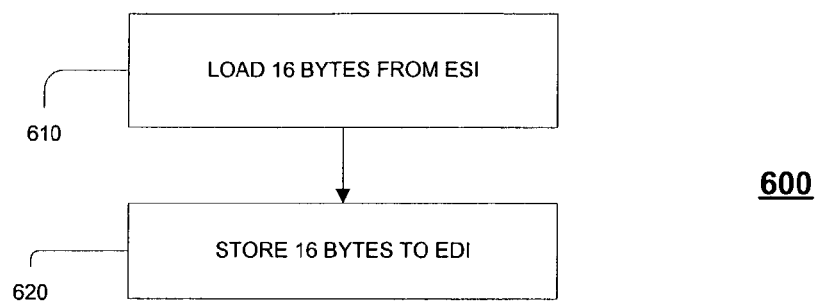
FIGS. 6, 7, 8A, 8B, and 9 are flow charts of processes for performing fast repeat string operations in performing the process of FIG. 5.

Referring to FIG. 6, the process 600 can be used to perform fast operations when both ESI and EDI are 16-aligned. The process 600 includes loading sixteen bytes from ESI (610) and storing sixteen bytes to EDI (620).

Figure 7:
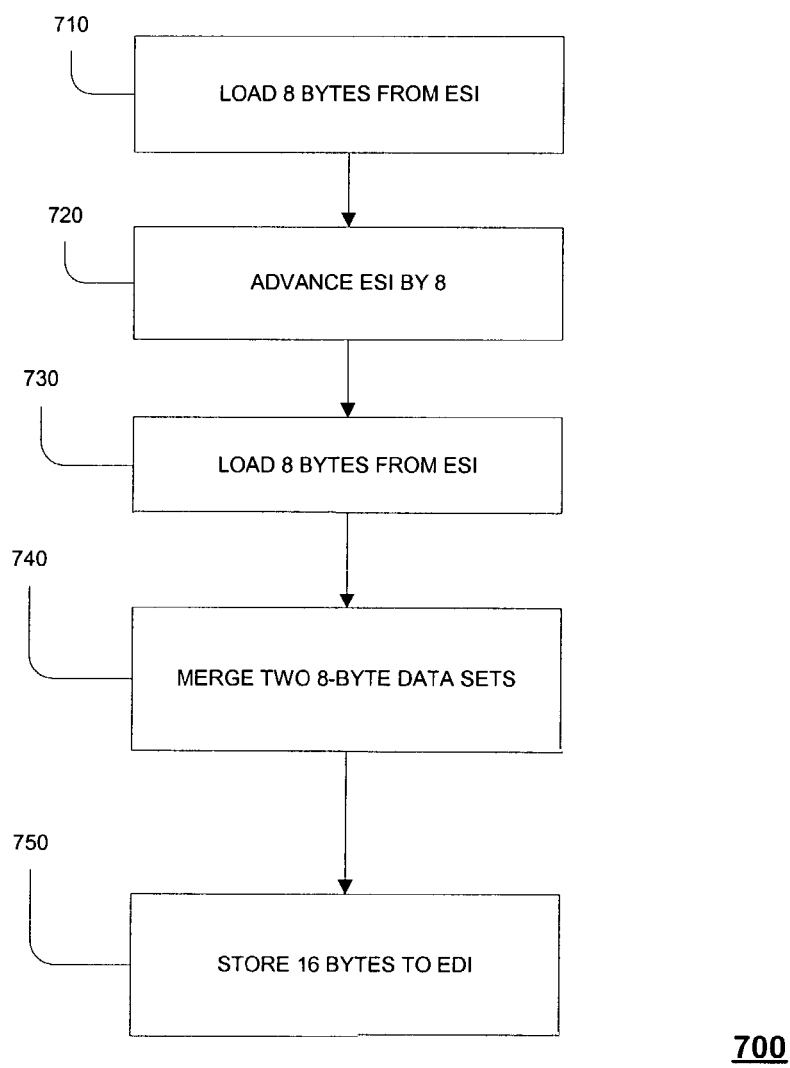

Referring to FIG. 7, the process 700 can be used to perform fast operations when ESI is 8-aligned and EDI is 16-aligned. The process 700 includes loading eight bytes from ESI (710), advancing ESI by eight (720), and loading another eight bytes from ESI (730). Advancing includes both incrementing and decrementing ESI depending on whether the fast operations are forward-marching or backward-marching, respectively. The two sets of eight bytes are merged (740) and stored to EDI (750). The merging involves concatenating the two sets of eight bytes to reflect the sixteen bytes at the original value of ESI.

Figure 8A:
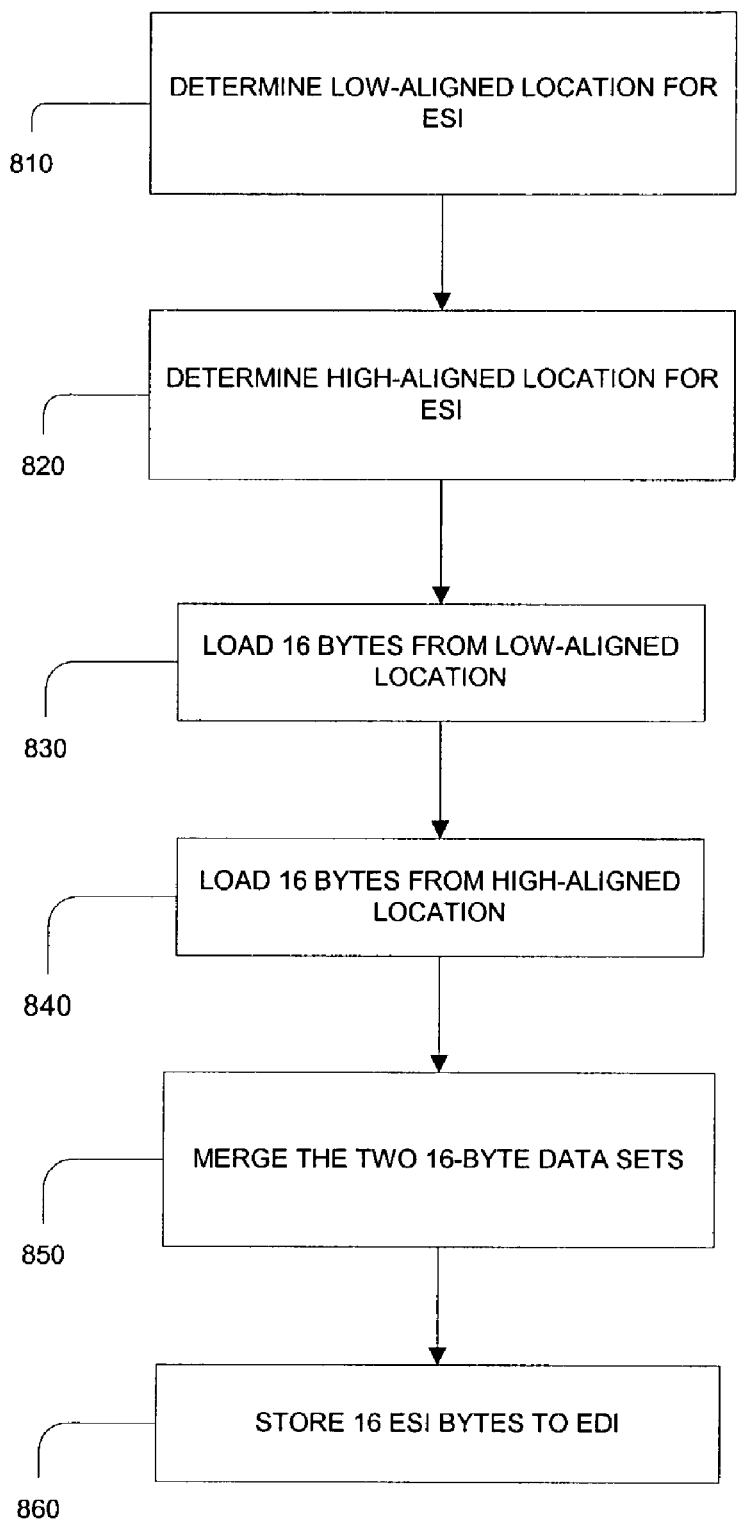

Referring to FIG. 8A, the process 800 can be used to perform fast operations when EDI is 16-aligned and ESI is not 16-aligned. The process can also be used, for example, when ESI is not 8-aligned. Generally, the process 800 loads two sixteen-byte data sets, from 16-aligned locations that bracket ESI, and merges the two data sets to get the desired sixteen bytes.

Specifically, a low-aligned location for ESI (810) and a high-aligned location for ESI (820) are both determined. The low-aligned location for ESI is the closest 16-aligned location that is lower in memory. The high-aligned location for ESI is the closest 16-aligned location that is higher in memory.

Next, sixteen bytes are loaded from the low-aligned location (830) and sixteen bytes are loaded from the high-aligned location (840). The two sixteen byte sets of data are then merged to get sixteen bytes corresponding to ESI (850). Merging, in this example, may involve extracting the data of interest in each of the sixteen byte sets of data by, for example, masking the two sets of data, and then concatenating the masked sets of data. The sixteen bytes corresponding to ESI are then stored to EDI (860).

Figure 8B:
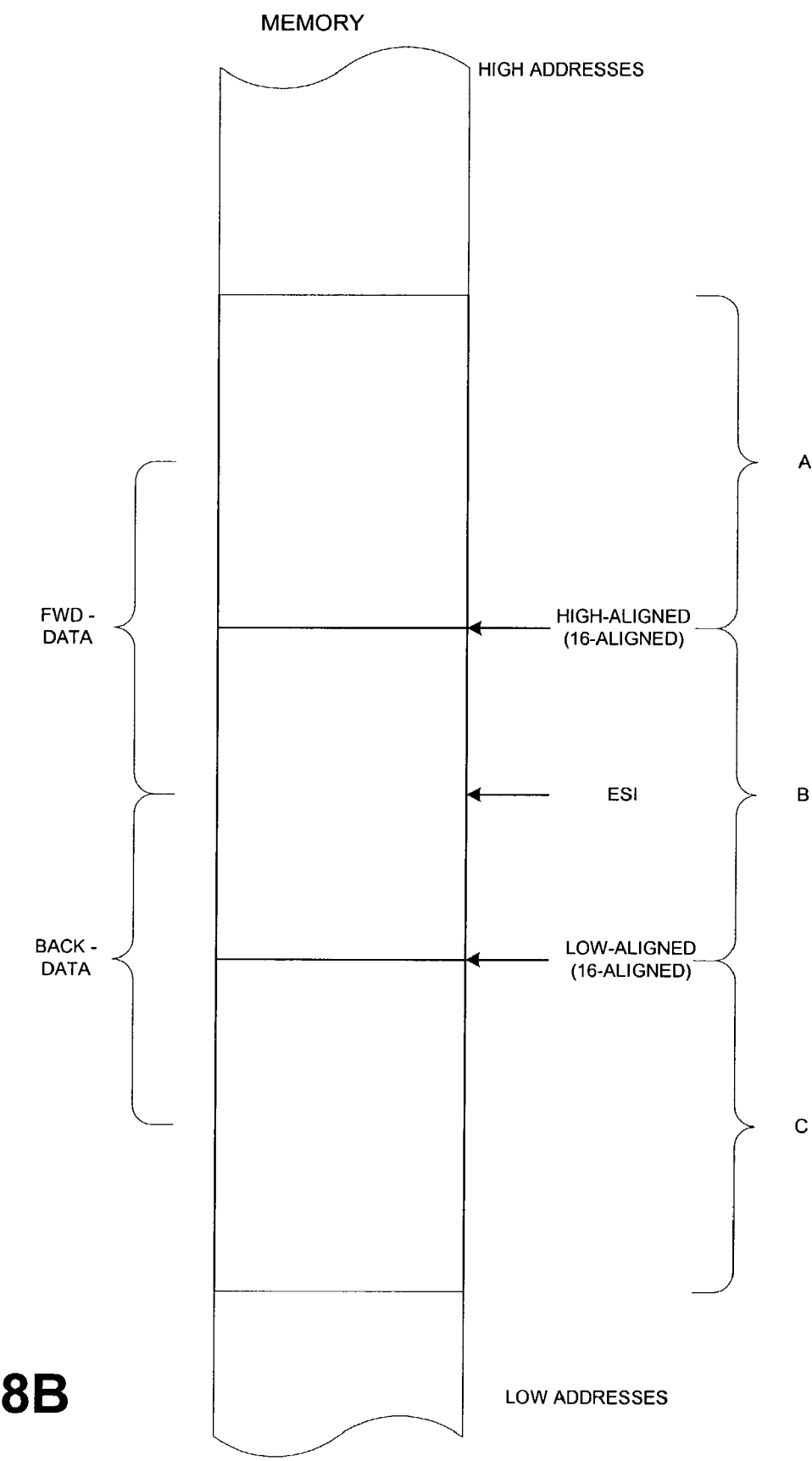

The process 800 can also be explained with reference to a memory 870 in FIG. 8B. The memory 870 shows ESI bracketed by a high-aligned location and a low-aligned location. If the repeat string operation is forward-marching, then the data labeled FWD-DATA needs to be stored to EDI. Accordingly, data sets B and A need to be loaded and merged. If the repeat string operation is backward-marching, then the data labeled BACK-DATA needs to be stored to EDI. Accordingly, data sets B and C need to be loaded and merged.

In other implementations, the loads from the low-aligned and high-aligned locations need not be sixteen bytes (or whatever the alignment size is) nor even the same number of bytes. For example, the low-aligned load can load data having a first predetermined size, the high-aligned load can load data having a second predetermined size, and the merged data can have a third predetermined size. In this example, the first, second, and third predetermined sizes can all be different from each other and from the alignment size. However, in certain implementations efficiencies are achieved by setting each of the first, second, and third predetermined sizes equal to the alignment size. Further, it is possible for the low-aligned and high-aligned locations to be the same, for example, when ESI is 16-aligned.

Figure 9:
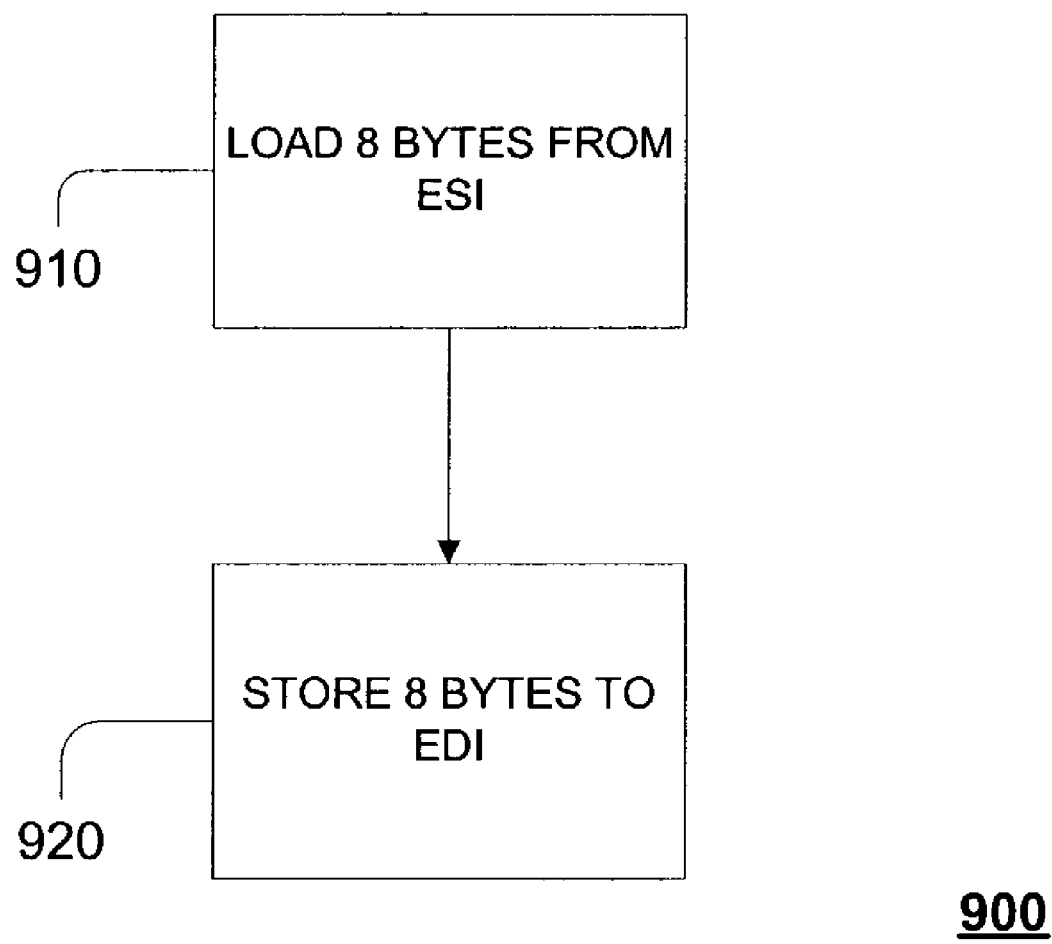

Referring to FIG. 9, a process 900 can be used to perform fast operations when EDI and ESI are both 8-aligned. The process 900 may also be used, for example, when EDI and ESI are both 8-aligned, but neither EDI nor ESI is 16-aligned. The process 900 includes loading eight bytes from ESI (910) and storing the eight loaded bytes to EDI (920).

Implementations can use one or more of the processes 600, 700, 800, 900 to perform fast operations. For example, an algorithm can be written in microcode that evaluates the alignment possibilities and chooses one of the processes 600, 700, 800, 900 to execute. Cases that do not satisfy the alignment requirements of any of the processes 600, 700, 800, 900 may generally be performed using compatible string operations.

Additional implementation concerns can arise from the fact that a fast operation is being used instead of the compatible operation specified by the instruction. It is clear that by performing different operations, that is, performing a fast operation instead of a compatible operation, the state of the machine might not be the same at all times during the fast operation as it would have been during the compatible operation. However, various techniques can be used to attempt to preserve the state of the machine that would have resulted from executing compatible operations, thus making the use of fast operations transparent to a program. Preserving the state can include, for example, leaving the same results in memory as with compatible operations, and triggering the same faulting conditions. These are discussed further in turn.

The first example mentioned above is leaving the same results in memory. One issue that this involves in a copy operation is avoiding overwriting the source data prior to using the source data. Because the requested repeat string operation did not necessarily contemplate a fast operation being used in place of the specified compatible operation, there may be insufficient separation between the source and destination locations.

Avoiding overwriting can be addressed in a variety of ways including, for example, requiring a minimum separation between ESI and EDI, or storing values in temporary locations. One implementation that uses sixteen-byte fast operations requires that EDI and ESI not be between one and fifteen bytes of each other.

Similar overwriting can also be a concern across page boundaries, as opposed to linear addresses. The page offsets for the source and destination data can be compared to ensure that there will be no overwrite if the source and data are on the same page or on adjoining pages. One implementation avoids fast transfers of sixteen bytes if the destination page offset is less than sixteen bytes in front of the source page offset. This implementation also allows for the possibility that the destination page may be equal to the source page plus one, while the destination page offset is near zero and the source page offset is near the upper limit, such as four kilobytes. In such a case, the implementation still ensures that the destination page plus offset is at least sixteen bytes in front of the source page plus offset.

The second example mentioned above is attempting to trigger the same faulting conditions on fast operations that compatible operations would have triggered. Examples include segmentation and protection faults, alignment exceptions, or paging violations. One technique for helping to trigger the same faults is to access exactly the same memory locations that would have been accessed with compatible operations. This can eliminate the possibility of receiving an incorrect or unexpected exception indicating that a segment or page is not accessible.

To avoid such accesses, compatible operations can be performed for a minimum of sixteen bytes (assuming an implementation desiring a 16-aligned address and using sixteen-byte transfers), as well as any additional compatible operations required to 16-align the address. Further, compatible operations can be performed at the end of the fast operations for at least sixteen bytes. In this way, if the process 800 is used, the source accesses will not access memory locations outside of the intended source data.

It should be noted that by accessing greater amounts of data at one time, for example, sixteen bytes instead of one (assuming a byte operand), the same debugging and instruction trapping capabilities may not be available. For example, it may not be possible to examine the state after every byte transfer.

Various implementations may need to address additional concerns. One example is that a processor may need to prevent the source data location and the destination data location from crossing or wrapping around the end of the supported address space.

Overhead Calculation

Figure 10:
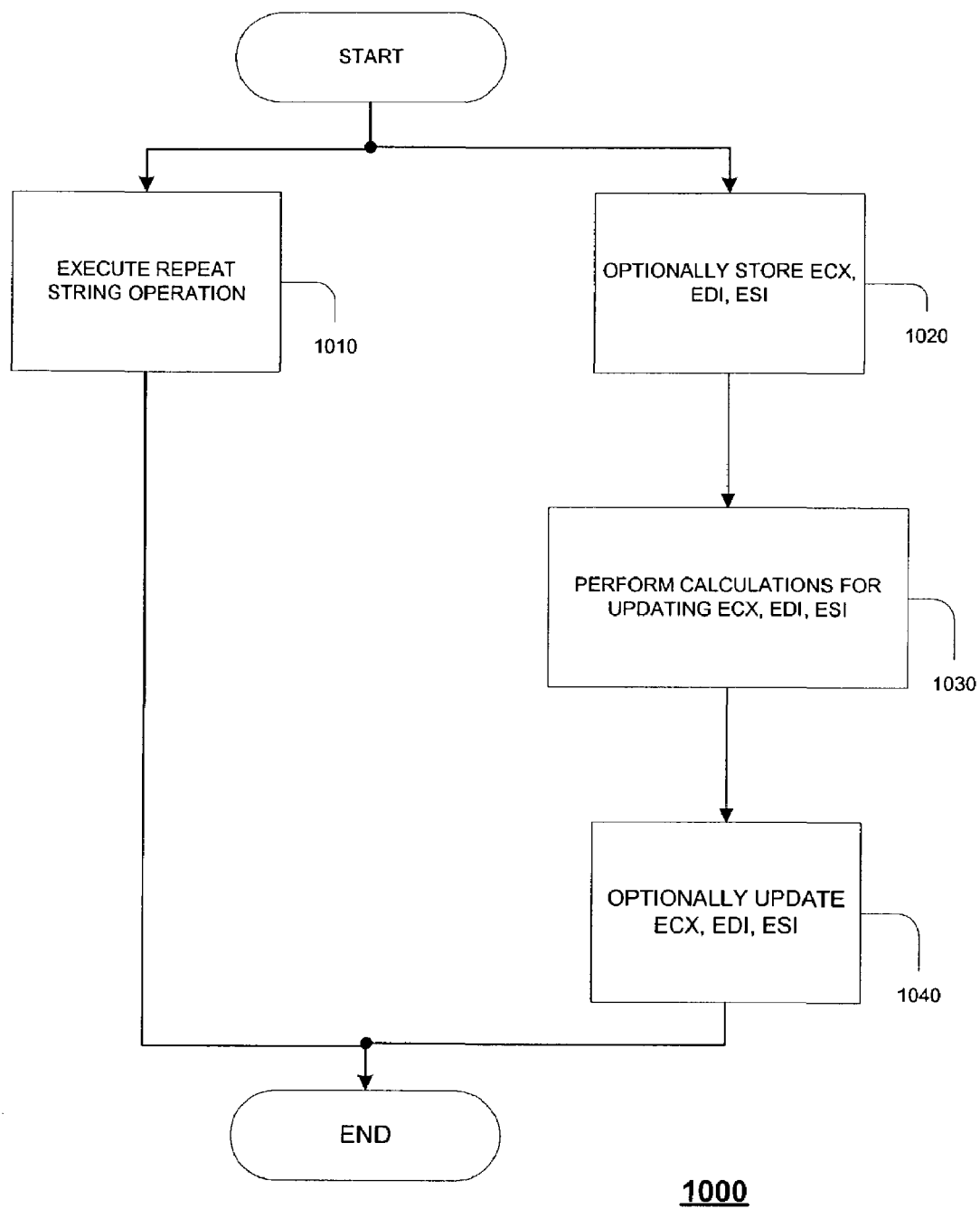
FIG. 10 is a flow chart of a process for performing overhead in parallel with performing a repeat string operation.

FIG. 10 provides a flow chart of a process 1000 for performing overhead in parallel with performing a repeat string operation. Overhead associated with performing a repeat string operation includes updating the three registers ECX, EDI, and ESI, which includes performing various calculations necessary to determine the update values. These calculations include integer-register operations that many processors can perform in parallel with the memory operations used to perform the repeat string iterations.

The process 1000 includes executing requested repeat string iterations (1010). The values of ECX, EDI, and ESI are optionally stored to preserve them for access during the execution of the requested repeat string iterations (1020). Next, calculations necessary for updating ECX, EDI, and ESI are performed in parallel with the execution of the requested repeat string iterations (1030). Finally, ECX, EDI, and ESI are optionally updated in parallel with the execution of the requested repeat string iterations (1040). The process 1000 allows idle capacity of a processor to be used and avoids at least part of the delay that would result if the overhead was not begun until after the iterations were executed.

Additional Implementations

Referring again to FIG. 1, the processor 120 can be implemented using a structure or device capable of executing instructions. Examples include a microprocessor, a controller, or a logic device. The various memories 130, 150, 160, also referred to as storage media, can be implemented with a structure or device for storing data at least temporarily. Examples include a register, a random-access memory ("RAM"), a read-only memory ("ROM"), and a floppy disk. The electronic circuitry 140 can be implemented with a structure or device capable of being configured to perform a function. Examples include an integrated circuit. The computer 110 may be implemented with a structure or device that includes the elements indicated in FIG. 1. Examples include a general-purpose computer such as, for example, a personal computer, a special-purpose computer, a personal digital assistant ("PDA"), an electronic organizer, an electronic game device, a cellular phone, a paging device, or a remote control. The networked computer 170 may be implemented in the manners described above for the computer 110. The network connection 180 may include a variety of connections such as, for example, a wired connection, a wireless connection, a local area network connection, and a wide area network connection.

Particular implementations may use circuitry to perform one or more of the disclosed processes. Such circuitry may include, for example, a memory, a processor with or without a microcode portion or a hardware portion, a microcode portion of a processor, a hardware portion of a processor, a controller, a logic device, an analog or digital circuit, or a chip or other integrated circuit. For example, one or more of the disclosed processes may be implemented by a processor performing instructions stored in microcode within the processor, or by hardware within a processor including, for example, a hardware sequencer controlling a hardware state machine. Processes may also be implemented in state machines running in software or microcode, for example.

The processes disclosed can be applied generally to instructions involving various data storage locations. Examples of data storage locations include processor registers, other processor memory, other computer memory, and external memory.

A number of implementations have been described. For example, implementations may be restricted to a stand-alone computer or involve a computer that is networked to another computer. Nevertheless, it will be understood that various modifications can be made. Accordingly, other implementations are within the scope of the following claims.

What is claimed is:

1. A method comprising:
   accessing a request for a repeat string operation having an operand size;
   aligning, by a processor, a source data location to a first aligned location having an address value divisible by a first predetermined integer, the aligning including (1) performing one or more string operations using data having a first size equal to the operand size and (2) determining that the address value of the first aligned location is divisible by the first predetermined integer; and
   after aligning, performing one or more string operations using data having a second size larger than the operand size.

2. The method of claim 1 further comprising aligning a destination data location to a second aligned location having an address value divisible by a second predetermined integer, wherein performing the one or more string operations results in the aligning of both the source data location and the destination data location.

3. The method of claim 2 wherein both the first arid the second aligned locations represent bytes, the first and second predetermined integers are equal to eight, and performing one or more string operations after aligning comprises:
   loading data having a size of eight bytes from the source data location; and
   storing the loaded data, having the size of eight bytes, to the destination data location.

4. The method of claim 2 wherein both the first and the second aligned locations represent bytes, the first and second predetermined integers are equal to sixteen, and performing one or more string operations after aligning comprises:
   loading data having a size of sixteen bytes from the source data location; and
   storing the loaded data, having the size of sixteen bytes, to the destination data location.

5. The method of claim 2 wherein the second aligned location represents bytes, the second predetermined integer is equal to sixteen, the first aligned location is divisible by eight, and performing one or more string operations after aligning comprises:
   loading a first set of data having a size of eight bytes from the source data location;
   advancing the source data location by eight bytes;
   loading a second set of data having a size of eight bytes from the source data location;
   merging the first and second sets of data into a sixteen byte data set; and
   storing the sixteen byte data set at the destination data location.

6. The method of claim 2 wherein the second aligned location represents bytes, the second predetermined integer is equal to sixteen, and performing one or more string operations after aligning comprises:
   loading a first set of data having a size of sixteen bytes from a closest aligned data location having an address value that is divisible by sixteen and is at or below the source data location;

loading a second set of data having a size of sixteen bytes from a closest aligned data location having an address value that is divisible by sixteen and is at or above the source data location;

merging the first and second sets of data into a merged sixteen byte data set corresponding to data at the source data location; and storing the merged sixteen byte data set to the destination data location.

7. The method of claim 1 wherein performing one or more string operations after aligning comprises:

loading a first set of data having a first predetermined data set size from a closest aligned data location having an address value that is divisible by the first predetermined integer and is at or below the source data location;

loading a second set of data having a second predetermined data set size from a closest aligned data location having an address value that is divisible by the first predetermined integer and is at or above the source data location;

merging the first and second sets of data into a merged data set having a third predetermined data set size and corresponding to data at the source data location; and storing the merged data set at the destination data location.

8. The method of claim 1 wherein the aligned location represents bytes and the first predetermined integer is equal to a number of bytes in the second size, the second size being larger than the operand size.

9. The method of claim 1 wherein the aligned location represents bytes and the first predetermined integer is one of eight and sixteen.

10. The method of claim 1 wherein performing one or more string operations after aligning comprises forward marching.

11. The method of claim 1 wherein performing one or more string operations after aligning comprises backward marching.

12. The method of claim 1 further comprising determining, before aligning, whether the source data location can be aligned to a location having an address value divisible by the first predetermined integer.

13. An article comprising a storage medium having stored thereon instructions that when executed by a machine result in at least the following:

access a request for a repeat string operation having an operand size;

align a source data location to a first aligned location having an address value divisible by a first predetermined integer, the aligning including (1) performing one or more string operations using data having a first size equal to an operand size and (2) determining that the address value of the first aligned location is divisible by the first predetermined integer; and after aligning, perform one or more string operations using data having a second size larger than the operand size.

14. The article of claim 13 wherein the instructions, when executed by a machine, further result in aligning a destination data location to a second aligned location having an address value divisible by the first predetermined integer, wherein performing the one or more string operations results in the aligning of both the source data location and the destination data location.

15. The article of claim 13 wherein performing one or more string operations after aligning comprises:

loading a first set of data having a first predetermined data set size from a closest aligned data location having an address value that is divisible by the first predetermined integer and is at or below the source data location;

loading a second set of data having a second predetermined data set size from a closest aligned data location having an address value that is divisible by the first predetermined integer and is at or above the source data location;

merging the first and second sets of data into a merged data set having a third predetermined size and corresponding to data at the source data location; and storing the merged data set at the destination data location.

16. An apparatus comprising circuitry to perform at least the following operations:

access a request for a repeat string operation having an operand size;

align a source data location to a first aligned location having an address value divisible by a first predetermined integer, the aligning including (1) performing one or more string operations using data having a first size equal to an operand size and (2) determining that the address value of the first aligned location is divisible by the first predetermined integer; and after aligning, perform one or more string operations using data having a second size larger than the operand size.

17. The apparatus of claim 16 wherein the circuitry further aligns a destination data location to a second aligned location having an address value divisible by the first predetermined integer, wherein performing the one or more string operations results in the aligning of both the source data location and the destination data location.

18. The apparatus of claim 16 wherein performing one or more string operations after aligning comprises:

loading a first set of data having a first predetermined size from a closest aligned data location having an address value that is divisible by the first predetermined integer and is at or below the source data location;

loading a second set of data having a second predetermined size from a closest aligned data location having an address value that is divisible by the first predetermined integer and is at or above the source data location;

merging the first and second sets of data into a merged data set having a third predetermined size and corresponding to data at the source data location; and storing the merged data set at the destination data location.

19. The apparatus of claim 16 wherein the circuitry comprises a memory having instructions stored thereon to perform at least one of the following operations:

access the request for the repeat string operation having the operand size;

align the destination data location to the first aligned location having an address value divisible by the first predetermined integer, the aligning including performing one or more string operations using data having the first size equal to the operand size; and after aligning, perform one or more string operations using data having the second size larger than the operand size.

20. The apparatus of claim 16 wherein the circuitry comprises a processor to perform at least one of the following operations:
   access the request for the repeat string operation having the operand size;
   align the destination data location to the first aligned location having an address value divisible by the first predetermined integer, the aligning including performing one or more string operations using data having the first size equal to the operand size; and
   after aligning, perform one or more string operations using data having the second size larger than the operand size.

21. The apparatus of claim 16 wherein the circuitry comprises:
   a memory;
   a processor; and
   a bus connecting the memory and the processor.

* * * * *